United States Patent
Kubo et al.

(10) Patent No.: US 12,234,337 B2
(45) Date of Patent: Feb. 25, 2025

(54) FILM, MEMBER, TRANSFER DEVICE, FIXING DEVICE, AND IMAGE FORMING APPARATUS

(71) Applicant: FUJIFILM Business Innovation Corp., Tokyo (JP)

(72) Inventors: Yosuke Kubo, Kanagawa (JP); Masato Ono, Kanagawa (JP); Shogo Hayashi, Kanagawa (JP); Satoya Sugiura, Kanagawa (JP); Hiroaki Tanaka, Kanagawa (JP); Masayuki Seko, Kanagawa (JP); Daisuke Tanemura, Kanagawa (JP); Iori Nishimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/365,335

(22) Filed: Aug. 4, 2023

(65) Prior Publication Data
US 2024/0317954 A1 Sep. 26, 2024

(30) Foreign Application Priority Data
Mar. 24, 2023 (JP) .................. 2023-049074

(51) Int. Cl.
G03G 15/16 (2006.01)
C08G 77/04 (2006.01)
C08J 7/00 (2006.01)
C08J 7/04 (2020.01)
G03G 15/00 (2006.01)
G03G 15/02 (2006.01)
G03G 15/20 (2006.01)

(52) U.S. Cl.
CPC ............ *C08J 7/0427* (2020.01); *C08G 77/04* (2013.01); *G03G 15/0216* (2013.01); *G03G 15/162* (2013.01); *G03G 15/1685* (2013.01); *G03G 15/2092* (2013.01); *G03G 15/6597* (2013.01); *C08J 2379/08* (2013.01)

(58) Field of Classification Search
CPC ............ G03G 15/0216; G03G 15/162; G03G 15/1685; G03G 15/2057; G03G 15/206; G03G 15/2092; G03G 15/6597; C08J 7/0427; C08J 77/04; C08J 2379/08
See application file for complete search history.

(56) References Cited

U.S. PATENT DOCUMENTS

2020/0096922 A1* 3/2020 Hayashi ............. G03G 15/2057

FOREIGN PATENT DOCUMENTS

JP 6305220 B2 4/2018
JP 6801474 B2 12/2020

* cited by examiner

*Primary Examiner* — Sophia S Chen
(74) *Attorney, Agent, or Firm* — Sughrue Mion, PLLC

(57) ABSTRACT

A film contains a siloxane compound having an alkyl group and a resin having a density of 1.1 g/cm³ or higher and a glass transition temperature of 150° C. or higher.

20 Claims, 4 Drawing Sheets

FILM, MEMBER, TRANSFER DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-049074 filed Mar. 24, 2023.

BACKGROUND

(i) Technical Field

The present invention relates to a film, a member, a transfer device, a fixing device, and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed.

For example, JP6801474B discloses "a water and oil repellent film including a resin layer which contains organosilsesquioxane containing silicone (excluding organosilsesquioxane having a T2m+6 (m≥1) structure) having no fluorine atom on a side chain group R1 binding to a silicon atom and a water and oil repellent layer which is laminated on the resin layer and contains organosilsesquioxane of a T2m+6 (m≥1) structure having a hydrocarbon group R2 binding to a silicon atom and in which at least a part of the organosilsesquioxane is exposed on a surface of the water and oil repellent layer, in which Hansen solubility parameters of the silicone consist of a dispersion parameter $\delta D$ of 10 $MPa^{1/2}$ or more and 15 $MPa^{1/2}$ or less, a polarity parameter $\delta P$ of 0 $MPa^{1/2}$ or more and 5 $MPa^{1/2}$ or less, and a hydrogen bonding parameter $\delta H$ of 0 $MPa^{1/2}$ or more and 5 $MPa^{1/2}$ or less, and the organosilsesquioxane is octamethylsilsesquioxane".

JP6305220A discloses "an electrophotographic member having a substrate and a surface layer, in which the surface layer contains a binder resin having an acrylic skeleton and a modified silicone compound having a polyether group and a hydroxyl group in one molecule, and an n-hexadecane contact angle on the surface of the surface layer is 30° or more".

SUMMARY

Aspects of non-limiting embodiments of the present disclosure relate to a film that contains a siloxane compound having an alkyl group and a resin and maintains high oil repellency longer, compared to a film that contains a resin having a density of less than 1.1 $g/cm^3$ and a glass transition temperature of lower than 150° C. or is found to have a sea-island structure consisting of island portions composed of a siloxane compound and a sea portion composed of a resin on a surface of the film.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above object include the following aspects.

According to an aspect of the present disclosure, there is provided a film that contains a siloxane compound having an alkyl group and a resin having a density of 1.1 $g/cm^3$ or higher and a glass transition temperature of 150° C. or higher.

BRIEF DESCRIPTION OF THE DRAWINGS

Exemplary embodiment(s) of the present invention will be described in detail based on the following figures, wherein.

DETAILED DESCRIPTION

Figure 1:
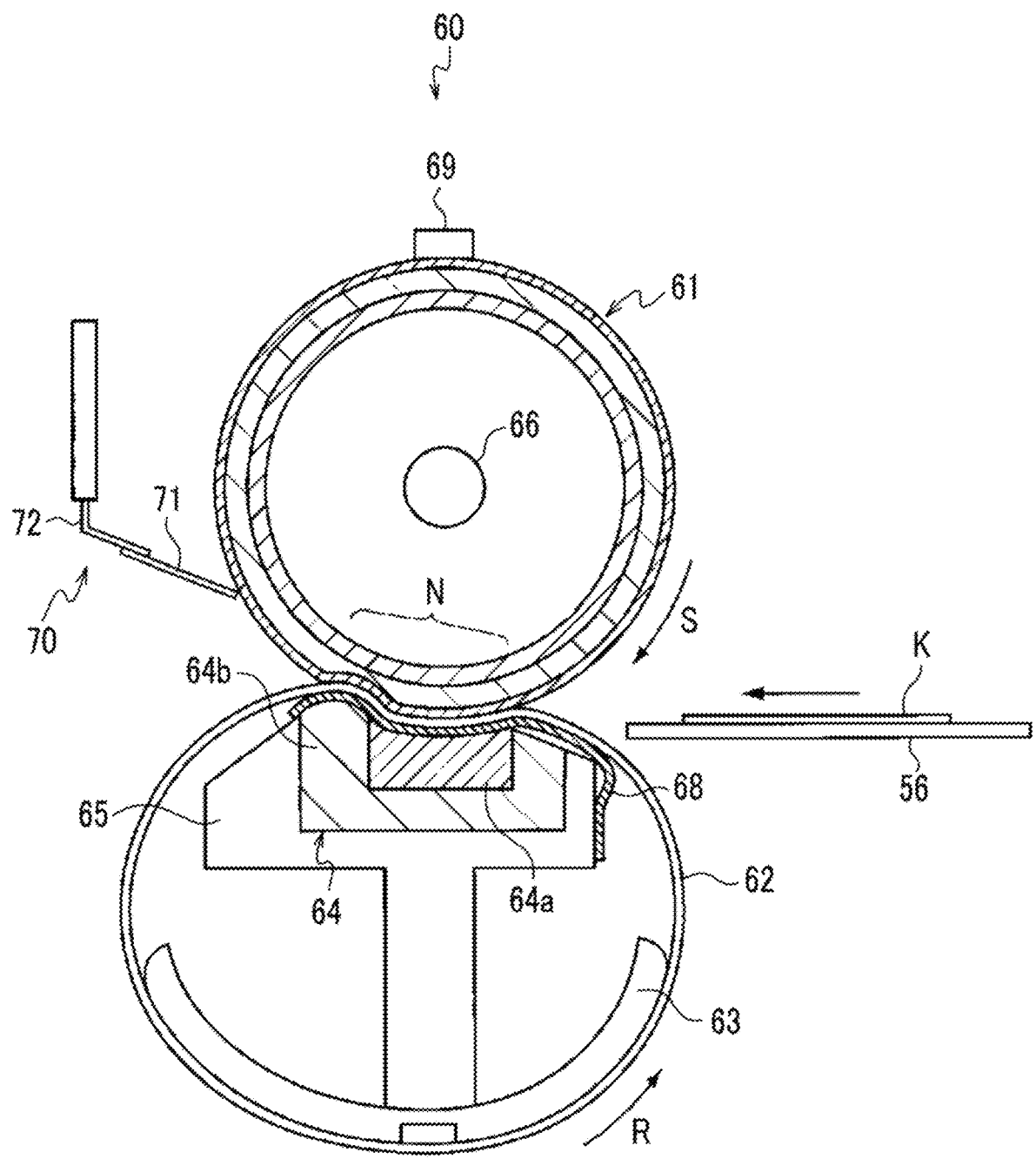
FIG. 1 is a schematic configuration view showing an example of a first exemplary embodiment of a fixing device according to the present exemplary embodiment.

Hereinafter, the present exemplary embodiment as an example of the present invention will be described. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step which is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Film

The film according to the present exemplary embodiment contains a siloxane compound having an alkyl group (hereinafter, also simply called "siloxane compound") and a resin having a density of 1.1 g/cm³ or higher and a glass transition temperature of 150° C. or higher.

Having the above configuration, the film according to the present exemplary embodiment maintains high oil repellency. The reason is presumed as follows.

The siloxane compound having an alkyl group is a compound having high oil repellency. Compared to a fluorine compound, such a siloxane compound has a higher dielectric constant. Therefore, using the siloxane compound is more beneficial than using a fluorine compound, in terms of strength stability in addition to imparting high oil repellency to a film.

In a case where the siloxane compound is added to a film, alkyl groups are aligned on the surface of the film, imparting high oil repellency.

However, in the film containing a siloxane compound, sometimes the main chain of the siloxane compound rotates due to an external load such as heat, and the alkyl group may move to sink into the resin, resulting in a decrease in oil repellency.

On the other hand, in a case where a resin having a high density and a glass transition point is adopted as a resin to be used in a film, the rotation of the main chain of the siloxane compound (that is, the movement of a methyl group) is restricted, and the alkyl group is inhibited from sinking into the resin. Accordingly, the oil repellency resulting from the siloxane compound is maintained. Presumably, even in an environment where the resin and the siloxane compound have vigorous molecular motion at a high temperature, the rotation of the main chain of the siloxane compound (that is, the movement of a methyl group) may be still restricted, which may enable the film to maintain high oil repellency.

Presumably, the film according to the present exemplary embodiment may maintain high oil repellency for the above reason.

In addition, the rotation of the main chain of the siloxane compound (that is, the movement of a methyl group) is considered to be also restricted even in an environment where the resin and the siloxane compound have vigorous molecular motion at a high temperature, which may enable the film to maintain high oil repellency even at a high temperature.

Hereinafter, a film according to the present exemplary embodiment will be specifically described.

The film according to the present exemplary embodiment contains a siloxane compound and a resin, and may contain other additives as necessary.

Siloxane Compound

As the siloxane compound, a siloxane compound having an alkyl group is used.

The siloxane compound having an alkyl group is a compound having two or more siloxane bonds [Si—O] and an alkyl group.

From the viewpoint of sustaining and improving high oil repellency, the alkyl group contained in the siloxane compound is, for example, preferably an alkyl group having 1 or more and 2 or less carbon atoms, and more preferably a methyl group.

As the siloxane compound, for example, a polysiloxane compound having an alkyl group on a side chain is preferable. The polysiloxane compound having an alkyl group on a side chain includes both a polysiloxane compound in which at least some of the side chains are alkylated and a polysiloxane compound in which all of the side chains are alkylated. In a case where the polysiloxane compound in which at least some of the side chains have an alkyl group (particularly, a siloxane compound in which at least some of the side chains have a methyl group) is used, higher oil repellency can be imparted. In addition, high oil repellency is easily maintained.

Examples of the polysiloxane compound having an alkyl group on a side chain include straight silicone oils such as dimethylpolysiloxane, methylphenylpolysiloxane, and methylhydrogenpolysiloxane; modified silicone oils such as polyether-modified dimethylpolysiloxane, amino-modified dimethylpolysiloxane, epoxy-modified dimethylpolysiloxane, carboxyl-modified dimethylpolysiloxane, carbinol-modified fluorine-modified dimethylpolysiloxane, methacryl-modified dimethylpolysiloxane, dimethylpolysiloxane, mercapto-modified dimethylpolysiloxane, phenol-modified dimethylpolysiloxane, and polyester resin-modified dimethylpolysiloxane; and the like.

Among these, from the viewpoint of improving high oil repellency, as the siloxane compound, for example, straight silicone oil is preferable, and dimethyl silicone is more preferable.

Examples of the siloxane compound also include silsesquioxane and the like.

The content of the siloxane compound with respect to the resin is, for example, preferably 3% by mass or more and 7% by mass or less, more preferably 3% by mass or more and 5% by mass or less, and even more preferably 4% by mass or more and 5% by mass or less.

In a case where the content of the siloxane compound is within the above range, higher oil repellency can be imparted. In addition, high oil repellency is easily maintained.

Resin

As the resin, a resin having a density of 1.1 or higher and a glass transition temperature (Tg) of 150° C. or higher is used.

In a case where the density and glass transition temperature of the resin are increased, high oil repellency is maintained.

The density of the resin is, for example, preferably 1.1 g/cm³ or higher, and more preferably 1.3 g/cm³ or higher.

The glass transition temperature (Tg) of the resin is, for example, preferably 150° C. or higher, and more preferably 200° C. or higher.

The density of the resin is measured as follows.

The density is measured by the water displacement method. The weight of a test piece is measured, and then the weight of the test piece immersed in an immersion liquid is measured. Assuming that the weight of the test piece is m1, the weight of the immersed test piece is m2, and the water density is $\rho L$, the density of the test piece is derived by $\rho = m1/(m1-m2) \times \rho L$.

The glass transition temperature of the resin is measured as follows.

The test piece is heated with a differential scanning calorimeter DSC (manufactured by Shimadzu Corporation), and the heat of reaction is measured. The point at which the baseline of the amount of heat is shifted is defined as the glass transition temperature.

Examples of the resin include a polyimide resin (PI resin), a polyamide-imide resin (PAI resin), a polyether ketone resin (for example, an aromatic polyether ether ketone resin or the like), a polyphenylene sulfide resin (PPS resin), a polyetherimide resin (PEI resin), a polyester resin, a polystyrene resin, a polyamide resin, a polycarbonate resin, a silicone resin, and the like.

For example, it is preferable to select a resin that satisfies the above density and glass transition temperature among the above resins.

In addition, the resin may be selected, for example, according to the use of the film.

For example, in a case where the film is used in a single-layer intermediate transfer belt, as the resin, an imide-based resin (that is, a resin containing a constitutional unit having an imide bond, for example, preferably a polyimide resin), a polyether ether ketone (PEEK) resin, or the like is preferable.

For example, in a case where the film is used in an outermost layer of a fixing belt, as the resin, an imide-based resin (that is, a resin containing a constitutional unit having an imide bond, for example, preferably a polyimide resin), a polyether ether ketone (PEEK) resin, or the like is preferable.

As a typical resin, polyimide will be described.

Examples of the polyimide resin include an imidized polyamic acid (polyimide resin precursor) which is a polymer of a tetracarboxylic dianhydride and a diamine compound.

Examples of the polyimide resin include a resin having a constitutional unit represented by General Formula (I).

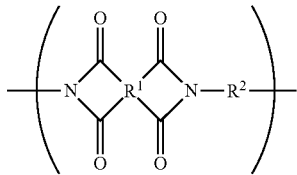

General Formula (I)

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic dianhydride used as a raw material of the polyimide resin include a pyromellitic dianhydride, a 3,3',4,4'-benzophenone tetracarboxylic dianhydride, a 3,3',4,4'-biphenyltetracarboxylic dianhydride, a 2,3,3',4-biphenyltetracarboxylic dianhydride, a 2,3,6,7-naphthalenetetracarboxylic dianhydride, a 1,2,5,6-naphthalenetetracarboxylic dianhydride, a 1,4,5,8-naphthalenetetracarboxylic dianhydride, a 2,2'-bis(3,4-dicarboxyphenyl)sulfonic dianhydride, a perylene-3,4,9,10-tetracarboxylic dianhydride, a bis(3,4-dicarboxyphenyl) ether dianhydride, and an ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

The content of the resin is the amount of a main component of the film. "Amount of a main component of the film" means that the amount of the most abundant component among the components contained in the film.

Other Additives

Examples of other additives include known additives such as a conducting agent, a reinforcing agent, an antioxidant, a surfactant, and a heat-resistant antioxidant, depending on the use of the film.

As a typical additive, a conducting agent will be described.

Examples of the conducting agent include carbon black, a metals (for example, aluminum, nickel, or the like), a metal oxide (for example, yttrium oxide, tin oxide, or the like), an ion conducting substance (for example, potassium titanate, LiCl, or the like); and the like. Among these, for example, carbon black is preferable.

Each of these conducting agents may be used alone, or two or more of these conducting agents may be used in combination.

Examples of the carbon black include Ketjen black, oil furnace black, channel black (that is, gas black), acetylene black, and the like. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

Among these, as the conducting agent, for example, channel black is preferable, and acidic carbon black having a pH of 5.0 or less is particularly preferable.

Examples of the acidic carbon black include carbon black having oxidized surface, such as carbon black obtained by imparting a carboxyl group, a quinone group, a lactone group, a hydroxyl group, or the like to the surface.

From the viewpoint of improving transferability to embossed paper, the acidic carbon black is, for example, preferably carbon black having a pH of 4.5 or less, more preferably acidic carbon black having a pH of 4.0 or less, even more preferably acidic carbon black having a pH of 3.0 or less, particularly preferably acidic carbon black having a pH of 2.0 or more and 3.0 or less, and extremely preferably acidic carbon black having a pH of 2.0 or more and 2.8 or less.

The pH of the acidic carbon black is a value measured by a pH measuring method specified in JIS Z8802 (2011).

The content of the conducting agent with respect to the film is, for example, preferably 10% by mass or more and 50% by mass or less, more preferably 12% by mass or more and 40% by mass or less, even more preferably 14% by mass or more and 30% by mass or less, and particularly preferably 15% by mass or more and 20% by mass or less.

The peel strength of the surface of the film according to the present exemplary embodiment at 25° C. is, for example, preferably 20 kPa or less, more preferably 19 kPa or less, and even more preferably 18.5 kPa or less.

The peel strength of the surface of the film according to the present exemplary embodiment at 140° C. is, for example, preferably 25 kPa or less, more preferably 24 kPa or less, and even more preferably 23.5 kPa or less.

In a case where the peel strength of the surface of the film according to the present exemplary embodiment at 25° C. and 140° C. is in the above range, the film has high oil repellency even in a temperature range from room temperature to a higher temperature.

The peel strength of the surface of the film at 25° C. and 150° C. is measured as follows.

First, from a target test piece, a quadrangle sample piece having a size 3 cm×4 cm is collected.

Then, in an environment at 22° C. and 15% RH, a voltage of 10 kV is applied to a surface of the film in the sample piece from 15 cm above the surface in a direction parallel to the surface of the film. In this state, polyester resin particles are scattered on the aforementioned surface and caused to adhere to the surface in an application amount of 3 g/cm$^2$. The polyester resin particles are scattered from not more than 10 cm above the surface of the film such that the polyester resin particles free-fall by the weight thereof, and are caused to adhere to the surface of the film under a load of 0 g/cm$^2$.

The polyester resin particles are polycondensates of dimethyl fumarate as a dicarboxylic acid and propylene glycol as a dialcohol. As the polyester resin particles, resin particles having a weight-average molecular weight of 25,000 and a volume-average particle size of 4.7 μm are used.

As the polyester resin particles, resin particles are adopted which substantially do not come into frictional contact with each other or with other members (such as a carrier) and substantially do not experience triboelectrification. Specifically, as the polyester resin particles, resin particles are adopted which have been stored for half a year in an environment at a temperature of 10° C. or higher and 22° C. or lower and a humidity of 10% RH or higher and 55% RH or lower after being manufactured.

Next, a probe of a tack tester (TA-500, manufactured by UBM) heated to 25° C. and 140° C. is brought close to and pressed on the central portion of the surface of the sample piece, the surface having the polyester resin particle adhered thereto, at 0.1 mm/s, and then kept as it is for 10 s under a pressing load of 3,900 gf, and the peel strength at the time when the probe is lifted at a pulling speed of 10 mm/s is measured.

Member

The member according to the present exemplary embodiment has the film according to the present exemplary embodiment as a layer configuring an outer peripheral surface.

The member according to the present exemplary embodiment may be either a single-layer member of the film according to the present exemplary embodiment or a member including a substrate and the film according to the present exemplary embodiment provided on the substrate.

In a case where the member according to the present exemplary embodiment is used in an intermediate transfer member for an electrophotographic image forming apparatus, as such a member, a single layer of the film according to the present exemplary embodiment or a laminate having the film as an outermost layer can be used. In the laminate, as a layer other than the film (for example, a substrate layer on which the film is to be provided, an elastic layer provided between the film and the substrate layer, or the like), a known layer provided on an intermediate transfer member can be used.

In a case where the member according to the present exemplary embodiment is used in a fixing member (such as a heating member, a pressure member, or a sliding member) for an electrophotographic image forming apparatus, as such a member, it is possible to use a member having a substrate, an elastic layer provided on the substrate, and a release layer that is provided on the elastic layer and configured with the film according to the present exemplary embodiment. As the substrate and the elastic layer, known substrate and elastic layers to be provide as a fixing member can be used. Furthermore, the fixing member may have a known metal heating layer for electromagnetic induction heating, between the substrate and the elastic layer.

Examples of the member according to the present exemplary embodiment include a paper transport member for an electrophotographic image forming apparatus and the like, in addition to the intermediate transfer member and the fixing member.

Transfer Device

The transfer device according to the present exemplary embodiment includes
    an intermediate transfer member that is configured with the member according to the present exemplary embodiment and has an outer peripheral surface to which a toner image is to be transferred,
    a primary transfer device that performs primary transfer of a toner image formed on a surface of an image holder to a surface of an intermediate transfer member, and
    a secondary transfer device that performs secondary transfer of the toner image transferred to the surface of the intermediate transfer member to a surface of a recording medium.

Primary Transfer Device

In the primary transfer device, the primary transfer member is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the outer peripheral surface of the intermediate transfer member is performed.

Secondary Transfer Device

In the secondary transfer device, the secondary transfer member is arranged on a toner image-holding side of the intermediate transfer member.

The secondary transfer device comprises, for example, a secondary transfer member and a back surface member that is arranged on the side opposite to the toner image-holding side of the intermediate transfer member. In the secondary transfer device, the intermediate transfer member and the recording medium are interposed between the secondary transfer member and the back surface member, and a transfer electric field is formed. In this way, secondary transfer of the toner image formed on the intermediate transfer member to the recording medium is performed.

The secondary transfer member may be a secondary transfer roll or a secondary transfer belt. As the back surface member, for example, a back roll is used.

The transfer device according to the present exemplary embodiment may be a transfer device that transfers a toner image to the surface of a recording medium via a plurality of intermediate transfer members. That is, the transfer device may be, for example, a transfer device of performing primary transfer of a toner image to a first intermediate transfer member from an image holder, performing secondary transfer of the toner image to a second intermediate transfer member from the first intermediate transfer member, and then performing tertiary transfer of the toner image to a recording medium from the second intermediate transfer member.

As at least one of the plurality of intermediate transfer members of the transfer device, the intermediate transfer member configured with the member according to the present exemplary embodiment is used.

Fixing Member

The fixing member according to the present exemplary embodiment includes a first rotary member and a second rotary member that is disposed in contact with an outer surface of the first rotary member, in which at least one of the first rotary member or the second rotary member is configured with the member according to the present exemplary embodiment.

Hereinafter, regarding the fixing device according to the present exemplary embodiment, a fixing device including a heating roll and a pressure belt will be described as a first exemplary embodiment, a fixing device including a heating belt and a pressure roll will be described as a second exemplary embodiment, and an electromagnetic induction heating-type fixing device including a heating belt and a pressure roll will be described as a third exemplary embodiment.

The fixing device according to the present exemplary embodiment is not limited to the first and third exemplary embodiments, and may be a fixing device including a heating roll or a heating belt and a pressure belt. Furthermore, in the fixing device according to the present exemplary embodiment, the aforementioned member according to the present exemplary embodiment may be used in all of a pressure roll, a heating belt, a heating roll, and a pressure belt.

Fixing Device of First Exemplary Embodiment

The first exemplary embodiment of the fixing device will be described with reference to FIG. 1. FIG. 1 is a schematic view showing an example (that is, a fixing device 60) of a first exemplary embodiment of the fixing device As shown in FIG. 1, a fixing device 60 is configured, for example, with a heating roll 61 (an example of the first rotary member) that is driven to rotate, a pressure belt 62 (an example of the second rotary member), and a pressing pad 64 (an example of a pressing member) that presses the heating roll 61 via the pressure belt 62.

Note that the pressing pad 64 may be relatively pressed, for example, by the pressure belt 62 and the heating roll 61. Therefore, the pressure belt 62 may be pressed on the heating roll 61, or the heating roll 61 may be pressed on the pressure belt 62.

A halogen lamp 66 (an example of a heating device) is provided on the inside of the heating roll 61. The heating device is not limited to the halogen lamp, and other heating members that generate heat may be used.

Meanwhile, for example, a thermosensitive element 69 is arranged in contact with the surface of the heating roll 61. The lighting of the halogen lamp 66 is controlled based on the temperature measured by the thermosensitive element 69, and the surface temperature of the heating roll 61 is kept at a target set temperature (for example, 150° C.).

The pressure belt 62 is rotatably supported, for example, by the pressing pad 64 and a belt running guide 63 arranged on the inside of the pressure belt 62. In a nip region N (nip portion), the pressure belt 62 is arranged such that the pressure belt 62 is pressed on the heating roll 61 by the pressing pad 64.

The pressing pad 64 is arranged on the inside of the pressure belt 62 such that the pressing pad 64 is in a state of being pressed on the heating roll 61 via the pressure belt 62, and the nip region N is formed between the pressing pad 64 and the heating roll 61.

In the pressing pad 64, for example, a front nip member 64a for securing a wide nip region N is arranged on the entrance side of the nip region N, and a peeling nip member 64b for distorting the heating roll 61 is arranged on the exit side of the nip region N.

In order to reduce the sliding resistance between an inner peripheral surface of the pressure belt 62 and the pressing pad 64, for example, a sheet-like sliding member 68 is provided on a surface of the front nip member 64a and the peeling nip member 64b, the surface being in contact with the pressure belt 62. The pressing pad 64 and the sliding member 68 are held by a holding member 65 made of a metal.

The sliding member 68 is provided such that the sliding surface thereof is in contact with, for example, the inner peripheral surface of the pressure belt 62, and is involved in holding and supplying of oil existing between the sliding member 68 and the pressure belt 62.

For example, the holding member 65 has a configuration in which the belt running guide 63 is attached to the holding member 65, and the pressure belt 62 rotates.

The heating roll 61 rotates, for example, in the direction of an arrow S by a driving motor not shown in the drawing. Following the rotation, the pressure belt 62 rotates in the direction of an arrow R opposite to the rotation direction of the heating roll 61. That is, for example, the heating roll 61 rotates clockwise in FIG. 1, while the pressure belt 62 rotates counterclockwise.

Then, paper K (an example of a recording medium) having an unfixed toner image is guided, for example, by a fixing entrance guide 56 and transported to the nip region N. While the paper K is passing through the nip region N, the unfixed toner image on the paper K is fixed by the pressure and heat acting on the nip region N.

In the fixing device 60, for example, by the front nip member 64a in the form of a recess conforming to the outer peripheral surface of the heating roll 61, a wider nip region N is secured, compared to a configuration having no front nip member 64a.

Furthermore, the fixing device 60 is configured, for example, with the peeling nip member 64b that is arranged to protruding from the outer peripheral surface of the heating roll 61, such that the heating roll 61 is locally distorted much in the exit region of the nip region N.

In a case where the peeling nip member 64b is arranged as above, for example, the paper K after fixing passes through a portion that is locally distorted much while passing through a peeling nip region. Therefore, the paper K is easily peeled off from the heating roll 61.

As an auxiliary device for peeling, for example, a peeling member 70 is provided on a downstream side of the nip region N of the heating roll 61. The peeling member 70 is, for example, held by a holding member 72, in a state where a peeling claw 71 is close to the heating roll 61 in a direction (counter direction) opposite to the rotation direction of the heating roll 61.

Fixing Device of Second Exemplary Embodiment

Figure 2:
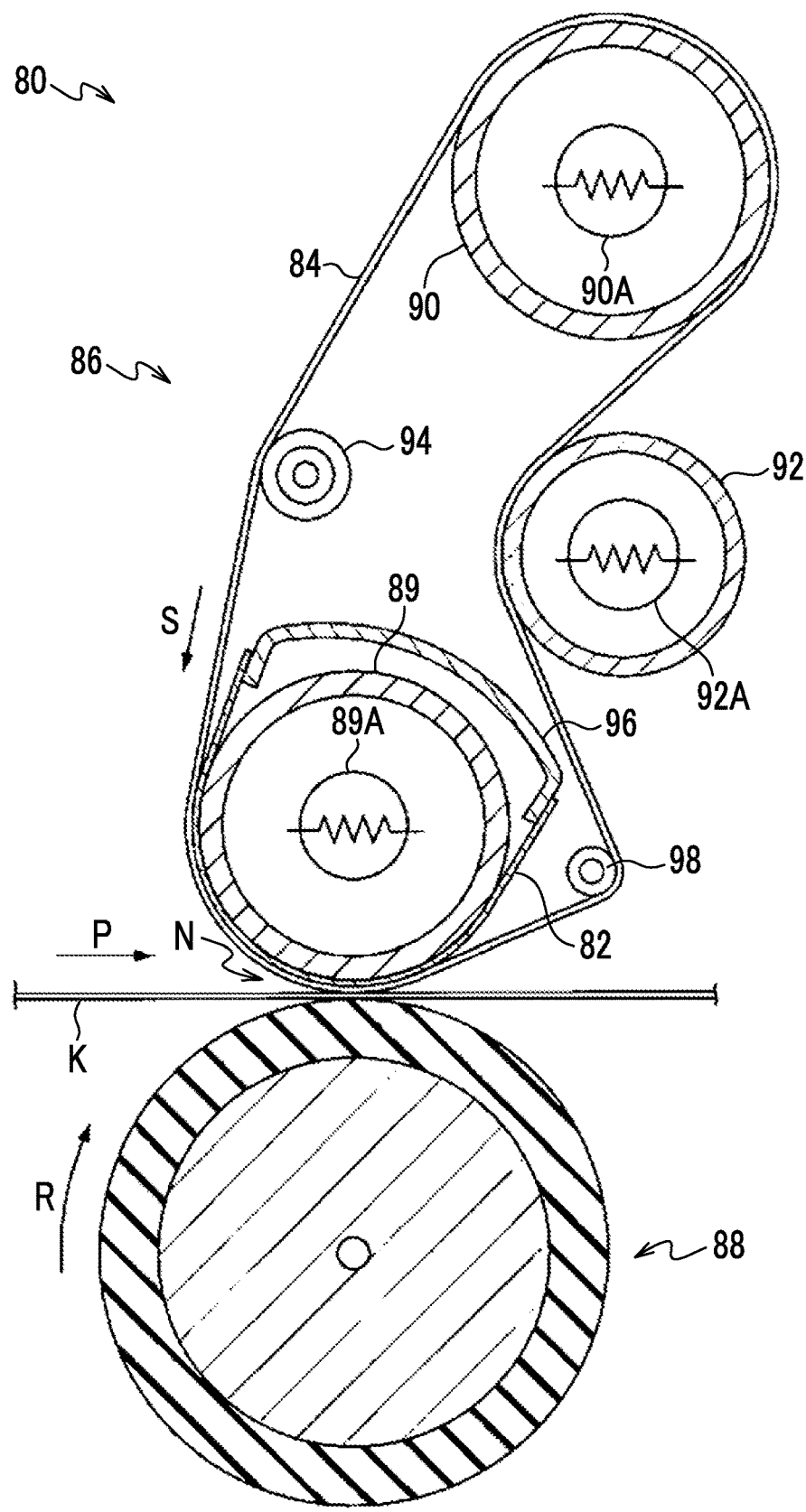
FIG. 2 is a schematic configuration view showing an example of a second exemplary embodiment of the fixing device according to the present exemplary embodiment.

The second exemplary embodiment of the fixing device will be described with reference to FIG. 2. FIG. 2 is a schematic view showing an example (that is, a fixing device 80) of a second exemplary embodiment of the fixing device As shown in FIG. 2, a fixing device 80 is configured, for example, with a fixing belt module 86 including a heating belt 84 (an example of the first rotary member) and a pressure roll 88 (an example of the second rotary member) arranged in a state of being pressed on a heating belt 84 (fixing belt module 86). For example, a nip region N (nip portion) is formed in a contact portion between the heating belt 84 (fixing belt module 86) and the pressure roll 88. In the nip region N, paper K (an example of a recording medium) is pressed and heated such that a toner image is fixed.

The fixing belt module 86 includes, for example, an endless heating belt 84, a heating and pressing roll 89 around which the heating belt 84 is wound on the side of the pressure roll 88 and which is driven to rotate by the rotational force of a motor (not shown in the drawing) and presses the heating belt 84 from an inner peripheral surface thereof toward the pressure roll 88, and a support roll 90 which supports the heating belt 84 from the inside at a position different from the heating and pressing roll 89.

The fixing belt module 86 is provided with, for example, a support roll 92 which is disposed outside the heating belt 84 and regulates the circulating path thereof, a posture correction roll 94 which corrects the posture of the heating belt 84 from the heating and pressing roll 89 to the support roll 90, and a support roll 98 which applies tension to the heating belt 84 from the inner peripheral surface on the downstream side of the nip region N formed between the heating belt 84 and the pressure roll 88.

The fixing belt module 86 is provided, for example, such that a sheet-like sliding member 82 is interposed between the heating belt 84 and the heating and pressing roll 89.

The sliding member 82 is provided such that the sliding surface thereof is in contact with, for example, the inner peripheral surface of the heating belt 84, and is involved in holding and supplying of oil existing between the sliding member 82 and the heating belt 84.

The sliding member 82 is provided, for example, in a state where both ends thereof are being supported by a support member 96.

On the inside of the heating and pressing roll 89, for example, a halogen heater 89A (an example of a heating device) is provided.

The support roll 90 is, for example, a cylindrical roll formed of aluminum. A halogen heater 90A (an example of a heating device) is provided on the inside of the support roll 90, such that the heating belt 84 is heated from the inner peripheral surface side.

Both end portions of the support roll 90 are provided with, for example, spring members (not shown in the drawing) pressing the heating belt 84 to the outside.

The support roll 92 is, for example, a cylindrical roll made of aluminum. A release layer consisting of a fluororesin having a thickness of 20 μm is formed on a surface of the support roll 92.

The release layer of the support roll 92 is formed, for example, to prevent a toner or paper powder from the outer peripheral surface of the heating belt 84 from depositing on the support roll 92.

For example, a halogen heater 92A (an example of a heating device) is provided on the inside of the support roll 92, such that the heating belt 84 is heated from the outer peripheral surface side.

That is, for example, the fixing belt module 86 is configured such that the heating belt 84 is heated, for example, by the heating and pressing roll 89, the support roll 90, and the support roll 92.

The posture correction roll 94 is, for example, a cylindrical roll made of aluminum, and an end position measuring mechanism (not shown in the drawing) for measuring the end position of the heating belt 84 is disposed in the vicinity of the posture correction roll 94.

The posture correction roll 94 is provided with, for example, an axial displacement mechanism (not shown in the drawing) which displaces the contact position of the heating belt 84 in the axial direction according to the measurement result of the end position measuring mechanism, and is configured to control meandering of the heating belt 84.

The pressure roll 88 is provided, for example, such that the pressure roll 88 is rotatably supported and pressed on the site of the heating and pressing roll 89 around which the heating belt 84 is wound by an urging device such as a spring not shown in the drawing. As a result, as the heating belt 84 (heating and pressing roll 89) of the fixing belt module 86 rotates and moves in the direction of the arrow S, the pressure roll 88 follows the heating belt 84 (heating and pressing roll 89) and rotates and moves in the direction of the arrow R.

The paper K having an unfixed toner image (not shown in the drawing) is transported in the direction of an arrow P and is guided to the nip region N of the fixing device 80. While the paper K is passing through the nip region N, the unfixed toner image on the paper K is fixed by the pressure and heat acting on the nip region N.

For the fixing device 80, an embodiment has been described in which a halogen heater (halogen lamp) is used as an example of a plurality of heating devices. However, the fixing device is not limited thereto, and a radiation lamp heating element (a heating element generating radiation (such as infrared rays) and a resistance heating element (a heating element generating Joule heat by passing an electric current through a resistor: for example, a heating element obtained by forming a film with a resistor on a ceramic substrate and baking the resultant) other than the halogen heater may be used.

Fixing Device of Third Exemplary Embodiment

Figure 3:
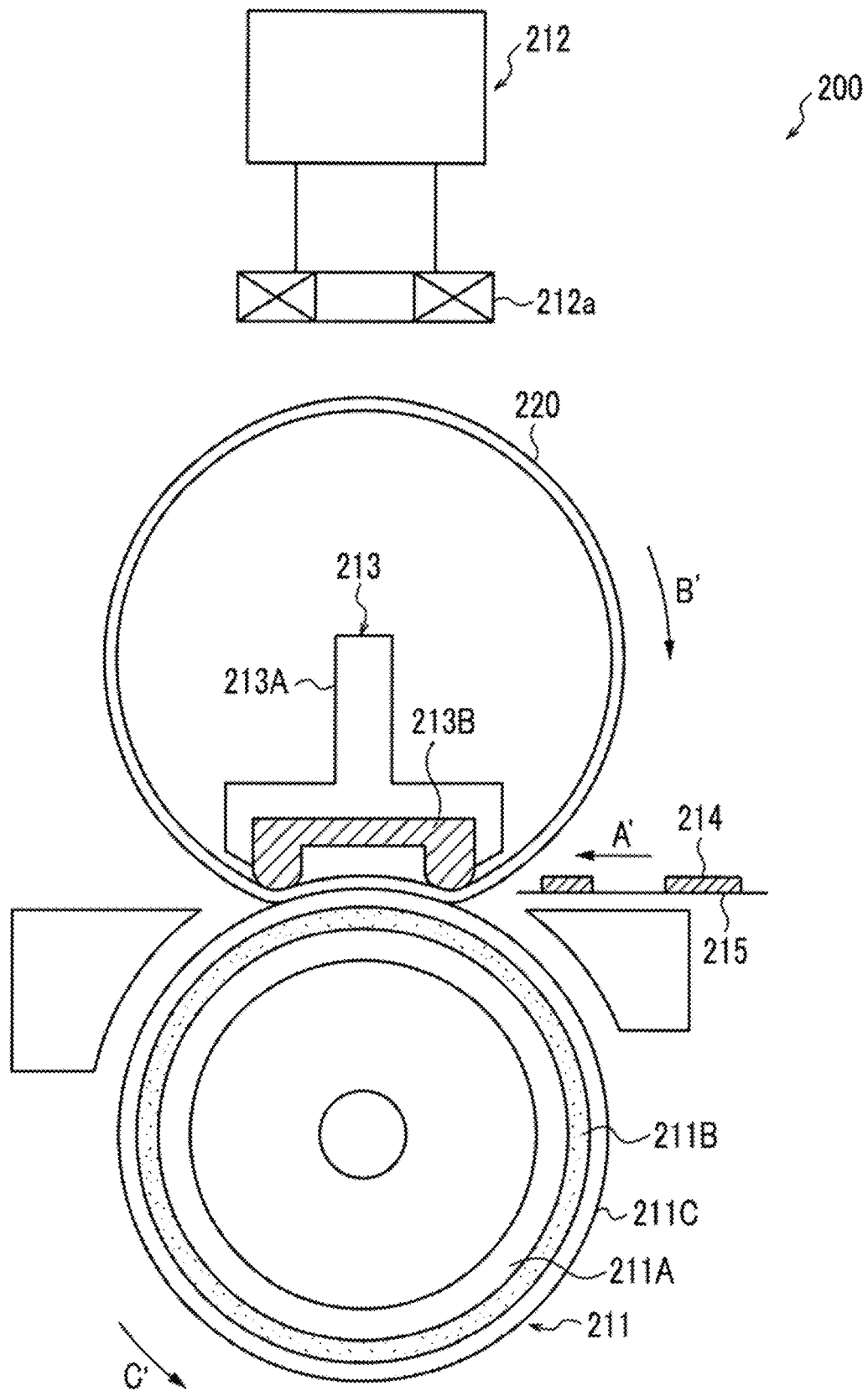
FIG. 3 is a schematic configuration view showing an example of a third exemplary embodiment of the fixing device according to the present exemplary embodiment.

The third exemplary embodiment of the fixing device will be described with reference to FIG. 3. FIG. 3 is a schematic view showing an example (that is, a fixing device 200) of a third exemplary embodiment of the fixing device As shown in FIG. 3, the fixing device 200 is an electromagnetic induction-type fixing device including a belt 220 that has a metal layer.

In the fixing device 200, a pressure roll (pressure member) 211 is arranged such that pressure is applied to a part of the belt 220. From the viewpoint of efficiently performing fixing, a contact region (nip) is formed between the belt 220 and the pressure roll 211, and the belt 220 is curved to conform to the peripheral surface of the pressure roll 211. Furthermore, from the viewpoint of ensuring the peelability of a recording medium, a bent portion where the belt is bent is formed at the end of the contact region (nip).

The pressure roll 211 is configured with a substrate 211A, an elastic layer 211B made of silicone rubber or the like that is formed on the substrate 211A, and a release layer 211C formed of a fluorine-based compound that is formed on the elastic layer 211B.

On the inside of the belt 220, an opposing member 213 is disposed at a position facing the pressure roll 211. The opposing member 213 consists of a metal, a heat-resistant resin, heat-resistant rubber, or the like, and has a pad 213B that is in contact with the inner peripheral surface of the belt 220 to locally increase pressure, and a support 213A that supports the pad 213B.

An electromagnetic induction heating device 212 having a built-in electromagnetic induction coil (excitation coil) 212a is provided at a position facing the pressure roll 211 (an example of a pressure member) across the belt 220. The electromagnetic induction heating device 212 applies an AC current to the electromagnetic induction coil, such that the generated magnetic field changes by an excitation circuit and an eddy current is generated in a metal layer (not shown in the drawing, for example, an electromagnetic induction metal layer) of the belt 220. The eddy current is converted into heat (Joule heat) by the electric resistance of a metal layer not shown in the drawing. As a result, the surface of the belt 220 generates heat.

The position of the electromagnetic induction heating device 212 is not limited to the position shown in FIG. 3. For example, the electromagnetic induction heating device 212 may be installed on the upstream side in the rotation direction B with respect to the contact region of the belt 220, or may be installed on the inside of the belt 220.

In the fixing device 200, by a driving device, a driving force is transmitted to the gear fixed to the end of the belt 220. As a result, the belt 220 performs self-rotation in the direction of the arrow B', and as the belt 220 rotates, the pressure roll 211 rotates in the opposite direction, that is, in the direction of the arrow C'.

A recording medium 215 on which an unfixed toner image 214 is formed is passed through a contact region (nip) between the belt 220 and the pressure roll 211 in the fixing device 200 in the direction of the arrow A', and pressure is applied to the molten unfixed toner image 214. As a result, the unfixed toner image 214 is fixed to the recording medium 215.

Image Forming Apparatus

Next, the image forming apparatus according to the present exemplary embodiment will be described.

The image forming apparatus according to the present exemplary embodiment includes an image holder, a charging device that charges a surface of the image holder, an electrostatic latent image forming device that forms an electrostatic latent image on the charged surface of the image holder, a developing device that contains a developer containing a toner and develops the electrostatic latent image formed on the surface of the image holder with the developer to form a toner image, a transfer device that transfers the toner image to a surface of a recording medium, and the fixing device that fixes the toner image to the surface of the recording medium.

As the transfer device, the transfer device according to the present exemplary embodiment described above is used.

Furthermore, as the fixing device, the fixing device according to the present exemplary embodiment is used.

In the image forming apparatus according to the present exemplary embodiment, each of the transfer device and the fixing device may be made into a cartridge such that the transfer device and the fixing device are detachable from an image forming apparatus. That is, the image forming apparatus according to the present exemplary embodiment may include the transfer device according to the present exemplary embodiment and the fixing device according to the present exemplary embodiment respectively, as a device configuring a process cartridge.

Hereinafter, the image forming apparatus according to the present exemplary embodiment will be described with reference to a drawing.

Figure 4:
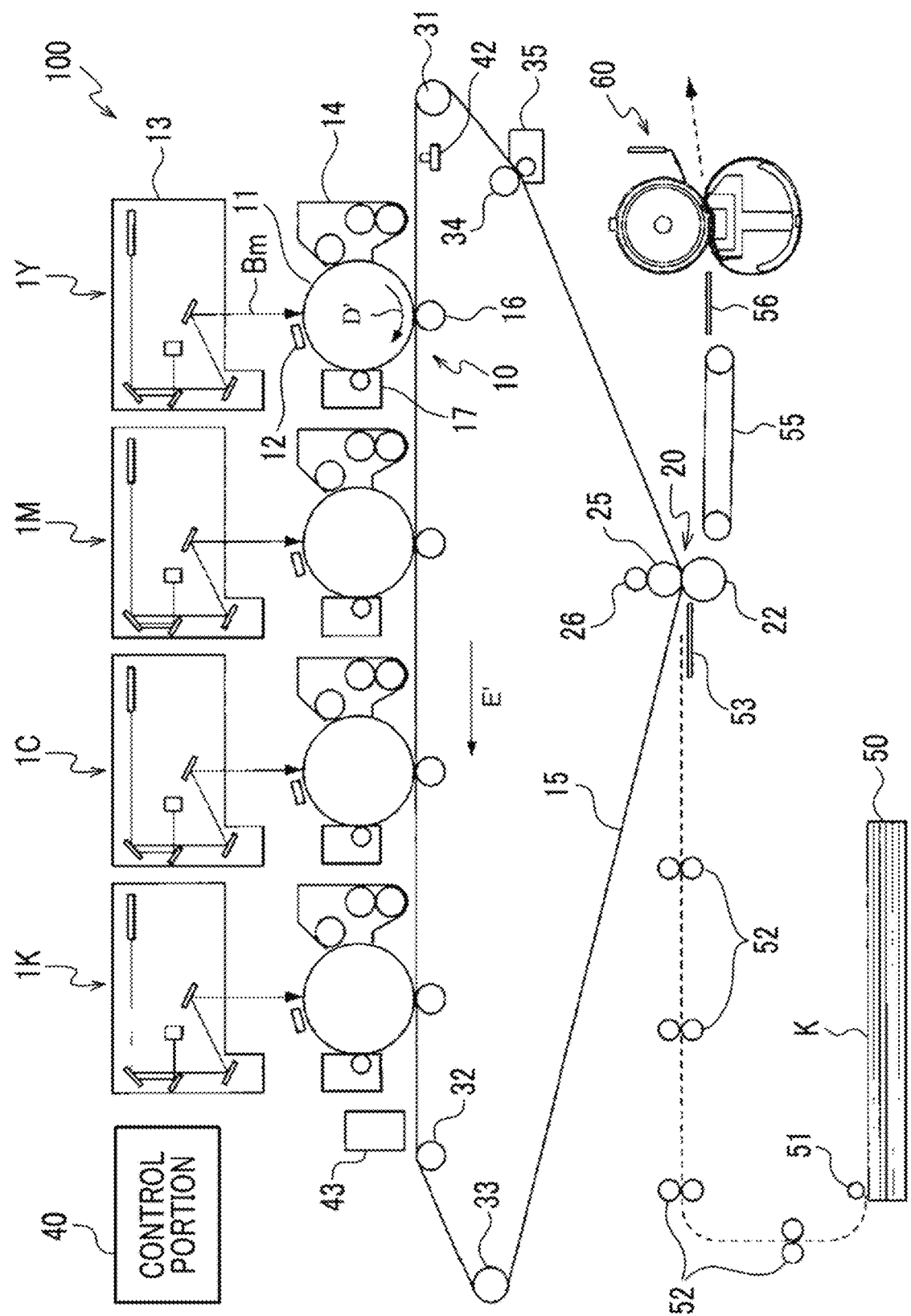
FIG. 4 is a schematic configuration view showing an example of an image forming apparatus according to the present exemplary embodiment.

FIG. 4 is a schematic configuration view showing the configuration of the image forming apparatus according to the present exemplary embodiment.

As shown in FIG. 4, an image forming apparatus 100 according to the present exemplary embodiment is, for example, an intermediate transfer-type image forming apparatus that is generally called a tandem type, and includes a plurality of image forming units 1Y, 1M, 1C, and 1K in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

Each of the image forming units 1Y, 1M, 1C, and 1K of the image forming apparatus 100 includes a photoreceptor 11 that rotates in the direction of an arrow D', as an example of an image holder that holds a toner image formed on the surface.

Around the photoreceptor 11, there are provided a charger 12 for charging the photoreceptor 11 as an example of a charging device and a laser exposure machine 13 for drawing an electrostatic latent image on the photoreceptor 11 as an example of an electrostatic latent image forming device (in FIG. 4, the exposure beam is represented by a mark Bm).

Around the photoreceptor 11, as an example of a developing device, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

The intermediate transfer belt 15 which is an intermediate transfer member is configured with a film-shaped pressure belt including a base layer that is a resin such as polyimide or polyamide and containing an appropriate amount of an antistatic agent such as carbon black. Furthermore, the intermediate transfer belt 15 is configured to have a volume resistivity of $10^6$ Ωcm or more and $10^{14}$ Ωcm or less and has a thickness of about, for example, 0.1 mm.

By various rolls, the intermediate transfer belt 15 is driven to circulate (rotate) in a direction E' shown in FIG. 4 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a support roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The surface of the back roll 25 is configured with a tube of blended rubber of EPDM and NBR in which carbon is dispersed, and the inside of the back roll 25 is configured with EPDM rubber. Furthermore, the back roll 25 is formed such that the surface resistivity thereof is $10^7$Ω/□ or more and $10^{10}$Ω/□ or less. The hardness of the back roll 25 is set to, for example, 70° (ASKER C: manufactured by KOBUN-SHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

The secondary transfer roll 22 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt cleaner 35 separable from the intermediate transfer belt 15 is provided which removes the residual toner or paper powder on the intermediate transfer belt 15 remaining after the secondary transfer and cleans the surface of the intermediate transfer belt 15.

The intermediate transfer belt 15, the primary transfer portion 10 (primary transfer roll 16), and the secondary transfer portion 20 (secondary transfer roll 22) correspond to an example of the transfer device.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

On the downstream side of the black image forming unit 1K, an image density sensor 43 for adjusting image quality is arranged.

The image forming apparatus according to the present exemplary embodiment includes, as a transport device for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport device, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and an intermediate transfer belt cleaner 35.

Hitherto, the present exemplary embodiment has been described. However, the present exemplary embodiment is not limited to the above exemplary embodiments, and various modifications, changes, and ameliorations can be added thereto.

EXAMPLES

Hereinafter, the present invention will be more specifically described with reference to examples. However, the present invention is not limited to the following examples.

Example A1

First Step

According to the mixing amount shown in Table 1, polyether-modified dimethylpolysiloxane (KP-126 manufactured by Shin-Etsu Chemical Co., Ltd.) as a siloxane compound is added to a polyamic acid of a polyimide varnish (manufactured by JFE Chemical Corporation, JIV300R, solid content of 18% by mass) as a resin or a resin precursor, thereby preparing a solution. The prepared solution is dispersed by a high-pressure collision disperser, thereby obtaining a coating liquid.

Second Step

By using a bar coater, the coating liquid is applied to a thickness of 100 μm.

Third Step

In a state where the cylinder on which the coating film is formed is kept horizontal, the coating film is heated and dried at 140° C. for 30 minutes.

Fourth Step

The dried coating film is heated up to a maximum temperature of 320° C. for 120 minutes, thereby obtaining a film on which a resin film is formed.

Examples A2 to A8 and Example B1

A film is obtained in the same manner as in Example A1, except that the type of resin or resin precursor, the type of siloxane compound, and the amount of siloxane compound are changed according to Table 1.

Example C1

First Step

Polycarbonate (TS-2040 manufactured by TEIJIN LIMITED) as a resin is added to tetrahydrofuran (THF manufactured by Mitsubishi Chemical Corporation) such that the solid content is 20%, and then polyether-modified dimethylpolysiloxane (KP-126 manufactured by Shin-Etsu Chemical Co., Ltd.) is added thereto as a siloxane compound, followed by kneading.

Second Step

By using a bar coater, the coating liquid is applied to a thickness of 100 μm.

Third Step

In a state where the cylinder on which the coating film is formed is kept horizontal, the coating film is heated and dried at 140° C. for 30 minutes, thereby obtaining a film.

Comparative Example A1

First Step

As a siloxane compound, polyether-modified dimethylpolysiloxane (KP-126 manufactured by Shin-Etsu Chemical Co., Ltd.) is added to 100 parts by mass of polyether ether ketone (VICTREXPEEK manufactured by Victrex plc) as a resin, the obtained mixture is pre-blended in advance and then subjected to thermal melt kneading using a twin-screw extruder (TEX30α manufactured by The Japan Steel Works, LTD.), thereby preparing a thermoplastic resin composition. The kneading temperature is adjusted to be within a range of 250° C. or higher and 300° C. or lower, and the thermal melt kneading time is set to about 5 minutes.

Second Step

The obtained thermoplastic resin composition is pelletized and dried at a temperature of 140° C. for 6 hours. Thereafter, the dried pellet-shaped thermoplastic resin composition is put into an injection molding apparatus (SE180D manufactured by Sumitomo Heavy Industries, Ltd.). Then, the cylinder temperature is set to 300° C., and the thermoplastic resin composition is subjected to injection molding in a mold at a temperature adjusted to 30° C., thereby forming a film.

Comparative Examples A2 and B1

A film is obtained in the same manner as in Comparative Example A1, except that the amounts of the resin and the siloxane compound are changed according to Table 1.

Characteristics

The characteristics of the films shown in Table 1 are measured according to the methods described above.

Evaluation

Surface Free Energy of Film Surface at Room Temperature and High Temperature

For each example, the surface free energy of the surface of the film at room temperature (25° C.) and the surface free energy of the surface of the film heated to a high temperature, 140° C., are evaluated. The evaluation standard is as follows.

A: The surface free energy is less than 26 mN/m.
B: The surface free energy is 26 mN/m or more and less than 30 N/m.
C: The surface free energy is 30 mN/m or more and less than 35 N/m.
D: The surface free energy is 35 N/m or more The abbreviations shown in Table 1 are as follows.

Resin

PI1: Polyimide varnish (manufactured by JFE Chemical Corporation, JIV300R)
PI2: Polyimide varnish (manufactured by UNITIKA LTD., KX-H)
PAI: Polyamideimide (manufactured by Hitachi Chemical Company, Ltd., HPC-9000)
PC: Polycarbonate (manufactured by TEIJIN LIMITED, ST-2040)
PEEK: Polyether ether ketone (VICTRIX PEEK manufactured by Victrex plc.)
PS: Polystyrene (MW1C manufactured by TOYO STYRENE CO., LTD.)

Siloxane Compound

S1: Polyether-modified dimethylpolysiloxane, manufactured by Shin-Etsu Chemical Co., Ltd., KP-126
S2: Polyether-modified dimethylpolysiloxane, manufactured by Shin-Etsu Chemical Co., Ltd., KP-101

TABLE 1

| | Resin | | | Siloxane compound | | Peel strength of surface of film | | Surface free energy | |
|---|---|---|---|---|---|---|---|---|---|
| | Type | Density | Tg °C. | Type | % by mass | 25° C. kPa | 140° C. kPa | At room temperature | At high temperature |
| Example A1 | PI 1 | 1.4 | 200 | S1 | 4.0 | 18.4 | 23.0 | A | C |
| Example A2 | PI 2 | 1.35 | 200 | S1 | 4.0 | 18.3 | 23.4 | A | C |
| Example A3 | PI 1 | 1.4 | 200 | S1 | 2.8 | 19.8 | 24.8 | B | C |
| Example A4 | PI 1 | 1.4 | 200 | S1 | 3.0 | 19.8 | 24.6 | B | C |
| Example A5 | PI 1 | 1.4 | 200 | S1 | 5.0 | 18.3 | 23.5 | A | C |
| Example A6 | PI 1 | 1.4 | 200 | S1 | 7.0 | 18.2 | 24.6 | A | C |
| Example A7 | PI 1 | 1.4 | 200 | S1 | 7.2 | 18.1 | 25.0 | A | C |
| Example A8 | PI 1 | 1.4 | 200 | S2 | 4.0 | 19.3 | 24.2 | B | C |
| Example B1 | PAI | 1.4 | 275 | S1 | 4.0 | 18.4 | 23.5 | A | C |
| Example C1 | PC | 1.2 | 150 | S1 | 4.0 | 19.0 | 24.2 | B | C |
| Comparative Example A1 | PEEK | 1.3 | 140 | S1 | 4.0 | 19.2 | 29.1 | B | D |
| Comparative Example A2 | PEEK | 1.3 | 140 | S1 | 7.0 | 18.8 | 29.2 | A | D |
| Comparative Example B1 | PS | 1.05 | 100 | S1 | 4.0 | 19.5 | 31.5 | B | D |

The above results tell that the films of the present examples have lower surface free energy at room temperature and a high temperature and have higher sustainability, compared to the films of comparative examples. Therefore, it has been confirmed that the films of the present examples can more reliably sustain high oil repellency compared to the films of comparative examples.

In addition, it has been confirmed that compared to the films of the comparative examples, the films of the present examples can more effectively impart high oil repellency sustainability to the outer peripheral surface of a member in a case where the films of the present examples are used as a layer configuring the outer peripheral surface of the member.

The present exemplary embodiment includes the following aspects.

((((1))))
A film comprising:
a siloxane compound having an alkyl group; and
a resin having a density of 1.1 g/cm$^3$ or higher and a glass transition temperature of 150° C. or higher.

(((2)))
The film according to (((1))),
wherein the siloxane compound is a polysiloxane compound having the alkyl group in at least some of side chains.

(((3)))
The film according to (((2))),
wherein the polysiloxane compound is a siloxane compound having a methyl group in at least some of side chains.

(((4)))
The film according to any one of (((1))) to (((3))),
wherein a content of the siloxane compound is 3% by mass or more and 7% by mass or less with respect to the resin.

(((5)))
The film according to (((4))),
wherein the content of the siloxane compound is 3% by mass or more and 5% by mass or less with respect to the resin.

(((6)))
The film according to any one of (((1))) to (((5))),
wherein the siloxane compound is a polysiloxane compound having the alkyl group in at least some of side chains, and
a content of the siloxane compound is 3% by mass or more and 5% by mass or less with respect to the resin.

(((7)))
The film according to any one of (((1))) to (((5))),
wherein the density of the resin is 1.3 g/cm$^3$ or higher.

(((8)))
The film according to (((6))),
wherein the density of the resin is 1.3 g/cm$^3$ or higher.

(((9)))
The film according to any one of (((1))) to (((8))),
wherein the glass transition temperature of the resin is 200° C. or higher.

(((10)))
The film according to any one of (((1))) to (((9))),
wherein the density of the resin is 1.3 g/cm$^3$ or higher, and the glass transition temperature of the resin is 200° C. or higher.

(((11)))
The film according to any one of (((1))) to (((10))),
wherein a peel strength of a surface of the film at 25° C. of 20 kPa or less.

(((12)))
The film according to any one of (((1))) to (((11))),
wherein a peel strength of a surface of the film at 140° C. is 25 kPa or less.

(((13)))
A member comprising:
the film according to any one of (((1))) to (((12))) as a layer configuring an outer peripheral surface of the member.

(((14)))
A transfer device comprising:
an intermediate transfer member that is configured with the member according to (((13))) and has an outer peripheral surface to which a toner image is to be transferred;
a primary transfer device that performs primary transfer of a toner image formed on a surface of an image holder to a surface of the intermediate transfer member; and
a secondary transfer device that performs secondary transfer of the toner image transferred to the surface of the intermediate transfer member to a surface of a recording medium.

(((15)))
An image forming apparatus comprising:
an image holder;
a charging device that charges a surface of the image holder;
an electrostatic latent image forming device that forms an electrostatic latent image on the charged surface of the image holder;
a developing device that contains a developer containing a toner and develops the electrostatic latent image formed on the surface of the image holder with the developer to form a toner image;
the transfer device according to (((14))) that transfers the toner image to a surface of a recording medium; and
a fixing device that fixes the toner image to the surface of the recording medium.

(((16)))
A fixing device comprising:
a first rotary member; and
a second rotary member that is arranged in contact with an outer surface of the first rotary member,
wherein at least at least one of the first rotary member or the second rotary member is configured with the member according to (((13))).

(((17)))
An image forming apparatus comprising:
an image holder;
a charging device that charges a surface of the image holder;
an electrostatic latent image forming device that forms an electrostatic latent image on the charged surface of the image holder;
a developing device that contains a developer containing a toner and develops the electrostatic latent image formed on the surface of the image holder with the developer to form a toner image;
a transfer device that transfers the toner image to a surface of a recording medium; and
the fixing device according to (((16))) that fixes the toner image to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A film comprising:
   a siloxane compound having an alkyl group; and
   a resin having a density of 1.1 g/cm$^3$ or higher and a glass transition temperature of 150° C. or higher.

2. The film according to claim 1,
   wherein the siloxane compound is a polysiloxane compound having the alkyl group in at least some of side chains.

3. The film according to claim 2,
   wherein the polysiloxane compound has a methyl group in at least some of side chains.

4. A member comprising:
   the film according to claim 3 as a layer configuring an outer peripheral surface of the member.

5. A member comprising:
   the film according to claim 2 as a layer configuring an outer peripheral surface of the member.

6. The film according to claim 1,
   wherein a content of the siloxane compound is 3% by mass or more and 7% by mass or less with respect to the resin.

7. The film according to claim 6,
   wherein the content of the siloxane compound is 3% by mass or more and 5% by mass or less with respect to the resin.

8. A member comprising:
   the film according to claim 6 as a layer configuring an outer peripheral surface of the member.

9. The film according to claim 1,
   wherein the siloxane compound is a polysiloxane compound having the alkyl group in at least some of side chains, and
   a content of the siloxane compound is 3% by mass or more and 5% by mass or less with respect to the resin.

10. The film according to claim 9,
    wherein the density of the resin is 1.3 g/cm$^3$ or higher.

11. The film according to claim 1,
    wherein the density of the resin is 1.3 g/cm$^3$ or higher.

12. The film according to claim 1,
    wherein the glass transition temperature of the resin is 200° C. or higher.

13. The film according to claim 1,
    wherein the density of the resin is 1.3 g/cm$^3$ or higher, and the glass transition temperature of the resin is 200° C. or higher.

14. The film according to claim 1,
    wherein a peel strength of a surface of the film at 25° C. is 20 kPa or less.

15. The film according to claim 1,
    wherein a peel strength of a surface of the film at 140° C. is 25 kPa or less.

16. A member comprising:
    the film according to claim 1 as a layer configuring an outer peripheral surface of the member.

17. A transfer device comprising:
    an intermediate transfer member that is configured with the member according to claim 16 and has an outer peripheral surface;
    a primary transfer device that performs primary transfer of a toner image formed on a surface of an image holder to the outer peripheral surface of the intermediate transfer member; and
    a secondary transfer device that performs secondary transfer of the toner image transferred to the outer peripheral surface of the intermediate transfer member to a surface of a recording medium.

18. An image forming apparatus comprising:
    the transfer device according to claim 17;
    a charging device that charges a surface of the image holder;
    an electrostatic latent image forming device that forms an electrostatic latent image on the charged surface of the image holder;
    a developing device that contains a developer containing a toner and develops the electrostatic latent image formed on the surface of the image holder with the developer to form the toner image;
    wherein the transfer device transfers the toner image to a surface of a recording medium; and
    a fixing device that fixes the toner image to the surface of the recording medium.

19. A fixing device comprising:
    a first rotary member; and
    a second rotary member that is arranged in contact with an outer surface of the first rotary member,
    wherein at least one of the first rotary member or the second rotary member is configured with the member according to claim 16.

20. An image forming apparatus comprising:
    an image holder;
    a charging device that charges a surface of the image holder;
    an electrostatic latent image forming device that forms an electrostatic latent image on the charged surface of the image holder;
    a developing device that contains a developer containing a toner and develops the electrostatic latent image formed on the surface of the image holder with the developer to form a toner image;
    a transfer device that transfers the toner image to a surface of a recording medium; and
    the fixing device according to claim 19 that fixes the toner image to the surface of the recording medium.

* * * * *